United States Patent [19]

Breister et al.

[11] 4,368,073
[45] * Jan. 11, 1983

[54] USE OF THE SODIUM SALT OF 2-MERCAPTOPYRIDINE-N-OXIDE TO SEPARATE GOLD FROM ACIDIC SOLUTIONS

[75] Inventors: Sigmund Breister, Hamden; Joseph R. Reiner, Northford, both of Conn.

[73] Assignee: Olin Corporation, New Haven, Conn.

[*] Notice: The portion of the term of this patent subsequent to May 26, 1998, has been disclaimed.

[21] Appl. No.: 258,989

[22] Filed: Apr. 30, 1981

Related U.S. Application Data

[63] Continuation-in-part of Ser. No. 115,163, Jan. 24, 1980, Pat. No. 4,269,621.

[51] Int. Cl.$^3$ .............................................. C22B 11/04
[52] U.S. Cl. .................................. 75/108; 75/118 R; 423/43
[58] Field of Search ................ 423/42, 43; 75/118 R, 75/108; 546/6; 210/725, 729

[56] References Cited

U.S. PATENT DOCUMENTS

| | | | |
|---|---|---|---|
| 2,809,971 | 10/1957 | Bernstein | 546/6 |
| 3,458,476 | 7/1969 | Boyer | 75/118 R |
| 3,992,506 | 11/1976 | Hooks et al. | 423/42 |
| 4,269,621 | 5/1981 | Reiner | 75/118 R |

OTHER PUBLICATIONS

Wise, E. M. (Ed.), *Gold, Recovery, Properties, and Applications,* D. Van Nostrand Co., Inc., Princeton, N.J. (1964), pp. 44–49, 325.

M. Edrissi, et al., *Microchemical Journal,* vol. 15, pp. 579–584 (1970).
M. Edrissi, et al., *Microchemical Journal,* vol. 16, pp. 177–183, 538–547 (1971).
J. A. W. Dalziel et al., *Analyst,* vol. 89, pp. 707–712 (1964).
Olin Industrial Biocides Product Data Bulletin for Zinc Omadine ® and Sodium Omadine ® (Copyright 1978).
Hampel, C. A., *Rare Metals Handbook,* Reinhold Publishing Corp., pp. 295–301.
H. J. Friese and F. Umland "Chelates of Vanadium with 2-Mercaptopyridine-N-Oxide" *Fresenius Z. Anal. Chem.,* 287, pp. 298–303 (1977).
K. H. Konig, B. Steinbrech, G. Schneeweiss, P. Chaudhuri, and H. U. Ehmcke, "On the Chromatography of Metal Chelates—II. TLC-Chromatography of the Metal Chelates of 1-Hydroxy-2-Pyridinthione with the Transition Metals of the 8th Group", *Fresenius Z. Anal. Chem.,* vol. 297, pp. 144–147 (1979).

*Primary Examiner*—Brian E. Hearn
*Attorney, Agent, or Firm*—William A. Simons

[57] ABSTRACT

Disclosed is a process for separating gold from acidic solutions having a pH below about 3 which comprises the steps of:
(a) adding a sufficient amount of the sodium salt of 2-mercaptopyridine-N-oxide to cause at least a portion of the gold in the aqueous acidic solution precipitate from the solution; and
(b) separating the precipitated gold from the acidic solution.

Also disclosed is that gold is selectively precipitated from acidic solutions containing other metals [e.g., Fe, Cu, Zn, Sn] when the molar ratio of added sodium 2-mercaptopyridine-N-oxide to gold in the acidic solution is less than about 1.5:1.

10 Claims, No Drawings

USE OF THE SODIUM SALT OF 2-MERCAPTOPYRIDINE-N-OXIDE TO SEPARATE GOLD FROM ACIDIC SOLUTIONS

CROSS-REFERENCE TO RELATED APPLICATIONS

This application is a continuation-in-part application of U.S. patent application Ser. No. 115,163, filed on Jan. 24, 1980 by J. Reiner and S. Breister entitled "USE OF HEAVY METAL CHELATES OF 2-MERCAPTOPYRIDINE-N-OXIDE TO SEPARATE SELECTED PRECIOUS METALS FROM ACIDIC SOLUTIONS", now U.S. Pat. No. 4,269,621.

BACKGROUND OF THE INVENTION

1. Field of the Invention

The present invention relates to a process for removing gold from strongly acidic solutions like manufacturing and waste solutions.

2. Description of the Prior Art

At the present time, the known methods of recovering precious metals such as gold, platinum and palladium from strongly acidic manufacturing solutions and waste solutions are usually very time-consuming and involve a number of processing steps. As an illustration of such processes, see pages 298–299 of Hampel, C. A., *Rare Metals Handbook*, Reinhold Publishing Company (1956) which show one such multi-step recovery process. In essence, these methods of recovering precious metals from acidic solutions resemble quantitative analysis procedures employed in laboratories.

Furthermore, these procedures are not very efficient when employed on large commercial scales. Also, the difficulty of recovery is always increased when more than one precious metal is present in the acidic solution, or when base metals like iron, copper or tin are additionally present.

Still further, the loss of precious metal values is tolerated in some operations rather than having to transport these strongly acidic solutions to suitable metal recovery facilities. Such transportation is costly and may be hazardous. Accordingly, there is a need in the art of precious metal recovery for a means for easily, efficiently and selectively removing precious metals from strongly acidic solutions. The process of the present invention offers a solution to that need with respect to gold.

Separately, it is known that the sodium salt and zinc chelate of 2-mercaptopyridine-N-oxide will chelate or transchelate, respectively, with other metal ions like iron, copper, mercury and silver. See Olin Corporation zinc Omadine ® and sodium Omadine ® Product Data Bulletin (1978). Further, it is also known that the ferric chelate of 2-mercaptopyridine-N-oxide will transchelate with mercury and this reaction is useful for the analytical determination of mercury in solutions. See Edrissi, M., et al; *Microchemical Journal*, Vol. 15, pages 579–584 (1970). Also, it is known that the sodium salt of 2-mercaptopyridine-N-oxide is a selective absorptiometric reagent for the determination of palladium in an alkaline solution and in the presence of masking agents. See Edrissi, M., et al; *Microchemical Journal*, Vol. 16, pages 177–183 (1971). Still further, U.S. Pat. No. 3,992,506 teaches that alkali metal (e.g., sodium) salts of 2-mercaptopyridine-N-oxide will react with silver in waste plating solutions and form the water insoluble silver salt of 2-mercaptopyridine-l-oxide and this precipitate can be separated from the solution.

BRIEF SUMMARY OF THE INVENTION

Accordingly, the present invention is directed to a process for separating gold from acidic solutions having a pH below about 3 which comprises the steps of:

(a) adding a sufficient amount of the sodium salt of 2-mercaptopyridine-N-oxide to the acidic solution to cause at least a portion of the gold in the solution to precipitate from the solution; and (b) separating the precipitated gold from the acidic solution.

Acidic solutions which may be treated by this process include process and waste solutions from either electroplating, etching, or metal refining.

After the precipitated gold is separated from the acidic solution by the above process, the gold may be recovered in its metallic form by pyrolysis or by conventional solvent extraction techniques.

DETAILED DESCRIPTION

Generally, strongly acidic solutions which may be treated by the process of the present invention contain from about 2 parts per million parts (ppm) by weight up to about 20% by weight gold. Preferably, the amount of gold may be from about 10 ppm by weight to about 10% by weight of the solution; more preferably, from about 50 ppm by weight to about 5% by weight.

The sodium salt of 2-mercaptopyridine-N-oxide is a commercially available product. It is available as a dry powder or in aqueous solutions (e.g., 40% by weight sodium 2-mercaptopyridine-N-oxide). It is preferred to employ aqueous solutions of this chemical in order to ensure better reaction with the gold.

Any strongly acidic solution which has a pH less than about 3 and contains gold may be employed in the process of the present invention. More preferably, it would be desirable to treat any acidic solution which has a pH in the range from less than 1 to about 2. This would include any concentrated solution of strong mineral acids like sulfuric acid, hydrochloric acid, nitric acid, and mixtures thereof like aqua regia. The most preferable acidic solution to be treated by the present invention is aqua regia because it is commonly used in the dissolving or refining of precious metals.

The amount of sodium salt of 2-mercaptopyridine-N-oxide added to the acidic solution must be sufficient to react with and cause precipitation of at least a portion of the gold contained in the acidic solution. More preferably, the amount of the sodium salt added should be sufficient to cause precipitation of at least a major portion (i.e., about 50% by weight) of the gold in the solution. Most preferably, the amount of sodium salt added should be sufficient to cause precipitation of at least 90% by weight of the gold.

The desired amount of sodium salt to be added to the acidic solution can be determined by first assaying the solution for its gold content and then determining the mole equivalents of sodium 2-mercaptopyridine-N-oxide necessary to react with the gold in the solution. From this mole equivalent amount, the proper weight of the sodium salt to be added may be determined. The mole equivalents of the sodium salt to be added may be determined according to the following equation (A):

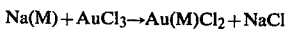

$$Na(M) + AuCl_3 \rightarrow Au(M)Cl_2 + NaCl \qquad (A)$$

wherein M represents a single 2-mercaptopyridine-N-oxide moiety. In other words, 1 mole of the sodium salt of 2-mercaptopyridine-N-oxide is one molar equivalent to 1 mole of gold present in the acidic solution to form an auric (pyridinethione-N-oxide) dichloride complex and NaCl. Other complexes may be made, but for purposes of this invention, it is assumed that all of the precipitated gold is in this complex.

Preferably, it is desirable to add about 0.5 to about 5 mole equivalents of the sodium salt for each mole of gold present in the solution. More preferably, it is desirable to add from about 0.8 to about 2.0 mole equivalents of the sodium salt. Most preferably, it is desirable to add about 1.0 to about 1.5 mole equivalents of the sodium salt. Surprisingly, it has been found that the use of less than about 1.5 mole equivalents of sodium 2-mercaptopyridine-N-oxide, preferably from about 0.5 to 1.3 mole equivalents, per mole of gold results in the selective precipitation of gold from the acidic solution to the substantial exclusion of other metals [e.g., Zn, Sn, Fe, Cu, Pb, Ni and the like].

The mode of adding the sodium salt into the solution or the time of the reaction and precipitation after this addition are not critical factors to the present invention. Any conventional addition means may be employed. Preferably, it is desirable to allow the reaction to proceed for a time period of about 3 minutes to about 120 minutes, more preferably, from about 5–30 minutes, from the addition of the sodium salt to the removal of the gold precipitate. Of course, the optimum reaction time will depend upon the mole ratio of sodium salt to gold and specific acidic solution involved, along with many other factors. In the case where aqua regia is the acidic solution, the addition of the sodium salt may cause the evolution of nitrous oxide fumes. Accordingly, the removal of the gold precipitate preferably should not begin until the evolution has substantially stopped.

In some situations where the gold content of the acidic solution is relatively high, it may be preferably to add water to dilute the solution before the addition of the sodium salt. The water dilution before addition of the sodium salt is desirable because otherwise the reaction mixture may be too thick and the reaction may be inhibited or retarded. Accordingly, it may be preferable to dilute the acidic solution with water by 10% by weight up to 1000% by weight, or even more if necessary.

However, it should be remembered that the amount of water added to the solution should not be so much so as to change the pH of the resulting diluted acidic solution to above about 3.0. In the case of very strong acidic solutions like concentrated solutions of aqua regia, water dilution is not going to change the pH appreciably unless an extremely large amount of water is added.

Also, it is preferred to agitate the reaction mixture during and after the addition of the sodium salt to ensure substantially complete reaction. Any conventional means of agitating strong acidic solutions may be used. Stirring may be one suitable means.

Other reaction parameters like reaction temperatures and pressures are also not seen to be critical to the present invention. Preferably, the present process may be carried out at temperatures from about 0° C. to about 70° C.; preferably, from about 20° C. to about 50° C. The most preferred temperature is at room or ambient temperature because no cooling or heating means may then be needed. Likewise, the present process may be carried out at atmospheric or superatmospheric pressures; but it is normally advantageous to use atmospheric pressure because no pressured equipment will then be needed.

The step of separating the precipitated gold may be carried out by any conventional solid/liquid separation means. Suitable examples include filtration, decanting, centrification and the like. Of course, it should be remembered that strong acidic solutions are involved and that the separation means should be compatible with such strong acids.

After the precipitated gold complex is separated from the acidic solution, the gold may be recovered in its metallic form by any conventional method. For example, it may be desirable to recover the gold in metallic form simply by pyrolysis (i.e., burning) of the precipitate.

The use of the sodium salt of 2-mercaptopyridine-N-oxide to selectively recover gold from strongly acidic solutions is surprising for several reasons. First, it is unexpected that the resulting gold adducts of 2-mercaptopyridine are stable at such extremely low pH levels. And further, the selective reaction and precipitation of gold instead of other base metals that may be present in the solution is unexpected.

Besides adding the above-noted sodium salt of 2-mercaptopyridine-l-oxide, the present invention also contemplates the use of corresponding derivatives of the sodium salt of 2-mercaptopyridine-N-oxide wherein the pyridine ring has one or more inert substituents attached to the pyridine ring like 3-, 4-, 5- and 6-methyl derivatives.

The following Examples are given to further illustrate the present invention. All parts and percentages are by weight unless explicitly stated otherwise.

EXAMPLE I

A solution of aqua regia having a pH of less than 1, used by a precious metal refiner to dissolve various metals, was assayed and found to contain the following:
Au—19.5%
Cu—5.2%
Zn—1.3%
Ag—38 ppm
Sn—50 ppm A 10 gram aliquot of this solution was calculated to contain the following gram weights and mole values:
Au—1.95 g or 0.00989 moles
Cu—0.52 g or 0.00818 moles
Zn—0.13 g or 0.00199 moles To demonstrate that a gold pyridinethione-N-oxide complex could be selectively and quantitatively precipitated by an equimolar amount of sodium 2-mercaptopyridine-N-oxide, [1.475 g (15.43 g of a 9.56% solution) (0.00989 moles)], was added quickly with stirring to the aqua regia solution which had been diluted with water. The reaction proceeded quickly and the mixture was then stirred for 20 minutes, filtered through Whatman No. 1 filter paper. The precipitate was washed, dried and weighed (3.7 grams). The filtrate was retained, weighed and assayed for metal content, giving the following results:
Au—<50 ppm
Cu—0.48%
Zn—0.12%

| Fe ppm | Pb ppm | Sn ppm | Cu ppm | Ni ppm | Mg ppm | Ca ppm | Zn ppm | % Base Metal |
|---|---|---|---|---|---|---|---|---|
| <100 | <75 | 1620 | 1700 | <50 | 4.5 | <150 | <25 | 0.37 |

Gold Assay Determination 0.37% base metal×1.576 g ppt. wt.=0.00583 g base metal.
After ignition, 49.93 g remained as metal or 0.787 g.
0.787 g total metal minus 0.00583 g base metal=0.7812 g gold.
0.7812 g gold divided by 0.787 g=99.25% assay.

EXAMPLE VI

Example III was repeated except that the sodium 2-mercaptopyridine-N-oxide was added to the aqua regia solution at the level of 1.38:1 molar equivalent relative to the gold content. The precipitate analysis was as follows:

| Fe ppm | Pb ppm | Sn ppm | Cu ppm | Ni ppm | Mg ppm | Ca ppm | Zn ppm | % Base Metal |
|---|---|---|---|---|---|---|---|---|
| <100 | <75 | 3050 | 4850 | <50 | 7.2 | <150 | <25 | 0.83 |

Gold Assay Determination 0.83% base metal×1.560 g ppt wt.=0.013 g base metal.
After ignition, 50.68% remained as metal or 0.784 g.
0.784 g total metal minus 0.013 g base metal=0.771 g gold.
0.771 g gold divided by 0.784 g=98.34% assay.

EXAMPLE VII

Example III was repeated except that sodium 2-mercaptopyridine-N-oxide was added to the aqua regia solution at the level of 1.57:1 molar equivalent relative to the gold content. The precipitate analysis was as follows:

| Fe ppm | Pb ppm | Sn ppm | Cu ppm | Ni ppm | Mg ppm | Ca ppm | Zn ppm | % Base Metal |
|---|---|---|---|---|---|---|---|---|
| <100 | 74 | 4750 | 14000 | <50 | 10 | <150 | 332 | 1.94 |

Gold Assay Determination 1.94% base metal×1.770 g ppt wt.=0.034 g base metal.
After ignition, 47.57% remained as metal or 0.842 g.
0.842 g total metal minus 0.034 g base metal=0.808 g gold.
0.808 g gold divided by 0.842 g total metal=95.96% assay.

EXAMPLE VIII

Example III was repeated except that sodium 2-mercaptopyridine-N-oxide was added to the aqua regia solution at the level of 1.89:1 molar equivalent, relative to the gold content. The precipitate analysis was as follows:

| Fe ppm | Pb ppm | Sn ppm | Cu ppm | Ni ppm | Mg ppm | Ca ppm | Zn ppm | % Base Metal |
|---|---|---|---|---|---|---|---|---|
| 706 | 147 | 1700 | 29500 | 80 | 22 | <150 | 12500 | 6.01 |

Gold Assay Determination 6.01% base metal×1.950 g ppt wt.=0.117 g base metal.
After ignition, 46.57% remained as metal or 0.908 g.
0.908 g total metal minus 0.117 g base metal=0.791 g gold.
0.791 g gold divided by 0.908 g total metal=87.11% assay.

EXAMPLE IX

Example III was repeated except that sodium 2-mercaptopyridine-N-oxide was added to the aqua regia solution at the level of 2.52:1 molar equivalent, relative to the gold content. The precipitate analysis was as follows:

| Fe ppm | Pb ppm | Sn ppm | Cu ppm | Ni ppm | Mg ppm | Ca ppm | Zn ppm | % Base Metal |
|---|---|---|---|---|---|---|---|---|
| 5050 | 443 | 11250 | 58500 | 1200 | 890 | 547 | 10000 | 8.78 |

Gold Assay Determination 8.78% base metal×2.580 g ppt wt.=0.227 g base metal.
After ignition, 40.78% remained as metal or 1.052 g.
1.052 g total metal minus 0.227 g base metal=0.825 g gold.
0.825 g gold divided by 1.052 g total metal=78.42% assay.

EXAMPLE X

A precipitate sample from Example V was analyzed for C, H, N, S and Cl values to show that the product auric(pyridinethione-N-oxide) dichloride was produced when a 1.26:1 mole ratio of sodium 2-mercaptopyridine-N-oxide to gold was employed. The analytical results are as follows:

| Element | Precipitate from 1.26:1 mole ratio | Theory |
|---|---|---|
| C | 15.7% | 15.2% |
| H | 1.3% | 1.01% |
| N | 3.62% | 3.55% |
| S | 7.94% | 8.12% |
| Cl | 14.6% | 18.0% |

EXAMPLE XI

Examples III–IX do not specifically confirm that gold is actually precipitated. To confirm that the gold did actually precipitate form the aqua regia solution, a portion of the gold pyridinethione-N-oxide dichloride complex precipitated from the reaction described in Example V (1.26:1 molar ratio) was redissolved in aqua regia and the gold precipitated according to Scotts standard gravimetric method, using oxalic acid. The resulting precipitate was ignited and weighed as gold metal:

Using these figures and the weight of the filtrate (103.5 g), the amount of each metal remaining in solution could be calculated as follows:

Volume of filtrate × % metal = grams remaining vs. starting conc.

103.5 mls × <0.005% Au = <0.00518 g vs. 1.95 g starting.

103.5 mls × 0.12% Zn = 0.124 g vs. 0.13 g starting.

103.5 mls × 0.48% Cu = 0.497 g vs. 0.529 g starting.

The above shows that essentially all of the gold was precipitated and that the copper and zinc remained in the filtrate.

A sample of the precipitate was ignited. The resulting metal was found to be 54.6% by weight of the precipitate. By theory, the percentage of gold in auric(-pyridinethione-N-oxide) dichloride complex would be 49.98% by weight.

X-ray analysis indicated that the metal was essentially pure gold, with some minor traces of copper and zinc.

EXAMPLE II

A 10 gram aliquot of the same aqua regia solution used in Example I was treated with a 3-molar excess of sodium 2-mercaptopyridine-N-oxide (4.425 g or 46.33 g of a 9.56% solution). The reaction proceeded in the same manner as Example I and the precipitate and filtrate were treated in the same manner.

The filtrate was assayed and found to contain metals at the following concentrations:

Au—<50 ppm
Cu—598, 600 ppm
Zn—0.54%

The precipitate was assayed and it was found that appreciable quantities of Cu and Zn had been precipitated with the gold. The values are presented below:

Au—34.5, 35.0%
Cu—7.2, 7.1%
Zn—1.1, 1.0%

This data shows that the addition of a 3:1 molar excess of sodium 2-mercaptopyridine-N-oxide to gold will precipitate other base metals that may be in solution with the gold.

The following Examples illustrate the effect of adding increasing amounts of sodium 2-mercaptopyridine-N-oxide to aqua regia solutions containing gold and 8 base metals.

An aqua regia solution containing gold and 8 base metals was prepared by adding and dissolving the metals. The assay of this solution was as follows:

Copper—1.7%
Zinc—0.68%
Iron—0.72%
Tin—80 ppm
Lead—0.17%
Nickel—0.67%
Calcium—0.57%
Magnesium—0.64%
Gold—4.16%

An aqueous solution containing 7.98% by weight of sodium 2-mercaptopyridine-N-oxide was prepared. 7.8952 Grams of this solution (0.004227 moles of sodium 2-mercaptopyridine-N-oxide) was equal to the molar concentration of the gold in 20 g of the aqua regia solution (0.832 g or 0.00422 moles of gold). Using these values, varying volumes of sodium 2-mercaptopyridine-N-oxide solution were made up and a series of experiments conducted to determine the optimum molar ratio between gold and the sodium 2-mercaptopyridine-N-oxide which would allow the quantitative and selective precipitation of auric pyridinethione dichloride complex.

EXAMPLE III 7.458 Grams of the sodium 2-mercaptopyridine-N-oxide solution (0.94 mole) was added dropwise, at ambient temperature to 20 g of the aqua regia solution. After addition, the mixture was stirred for an additional 30 minutes, filtered, washed and dried at 40° C. After weighing, a portion of the precipitate was ignited to determine the total metal content. Another portion was analyzed by atomic absorption to determine what metals were precipitated and in what quantity. Because the percentage of gold in the precipitate was so great, no accurate assay of gold could be made by atomic absorption. The results were as follows:

| Precipitate Analysis | | | | | | | | |
|---|---|---|---|---|---|---|---|---|
| Fe ppm | Pb ppm | Sn ppm | Cu ppm | Ni ppm | Mg ppm | Ca ppm | Zn ppm | % Base Metal |
| <100 | <75 | 1000 | 990 | <50 | 1.5 | <150 | <25 | .24 |

Gold Assay Determination 0.24% base metal × 1.521 g ppt wt. = 0.00365 g base metal.

After ignition, 50.95% remained as metal or 0.775 g total.

0.775 g total metal minus 0.00365 g base metal = 0.77135 g gold.

0.77135 g gold divided by 0.775 g = 99.52% assay.

EXAMPLE IV

Example III was repeated except that sodium 2-mercaptopyridine-N-oxide was added to the aqua regia solution at the level of 1.13:1 molar equivalent relative to the gold content. The precipitate analysis was as follows:

| Fe ppm | Pb ppm | Sn ppm | Cu ppm | Ni ppm | Mg ppm | Ca ppm | Zn ppm | % Base Metal |
|---|---|---|---|---|---|---|---|---|
| <100 | <75 | 707 | 925 | <50 | 12 | <150 | <25 | 0.21 |

Gold Assay Determination 0.21% base metal × 1.570 g ppt wt. = 0.0038 g base metal.

After ignition, 50.32% remained as metal or 0.790 g.

0.790 g total metal minus 0.0038 g base metal = 0.7862 g gold.

0.7862 g gold divided by 0.790 g = 99.52% assay.

EXAMPLE V

Example III was repeated except that sodium 2-mercaptopyridine-N-oxide was added to the aqua regia solution at the level of 1.26:1 molar equivalent relative to the gold content. The precipitate analysis was as follows:

Total sample wt.—0.1338 g
Gold ppt wt.—0.0672 g

The percentage of gold in the sample was determined to be 50.2%. This compares favorably with the 49.55% gold content calculated for this sample by determining the base metal concentration in the sample.

What is claimed is:

1. A process for separating gold from acidic solutions having a pH below about 3 and containing at least one other metal selected from the group consisting of iron, copper, tin, lead or mixtures thereof, which comprises the steps of:
   (a) adding a sufficient amount of the sodium salt of 2-mercaptopyridine-N-oxide to said acidic solution to cause at least a portion of said gold in said acidic solution to precipitate from said acidic solution without any appreciable precipitation of said other metals; and
   (b) separating said precipitated gold from said acidic solution and said other metals.

2. The process of claim 1 wherein said separated precipitated gold is later recovered in its metallic form.

3. The process of claim 1 wherein at least a major portion of said gold in said acidic solution is precipitated.

4. The process of claim 1 wherein the amount of sodium salt of 2-mercaptopyridine-N-oxide added is in the range from about 0.5 to about 5.0 moles per one mole of said gold in said solution.

5. The process of claim 1 wherein said acidic solution is aqua regia.

6. A process for the selective precipitation and separation of gold from acidic solutions having a pH below about 3 and containing other metals selected from the group consisting of iron, copper, tin, lead, or mixtures thereof, which comprises the steps of:
   (a) adding sodium 2-mercaptopyridine-N-oxide to cause at least a portion of said gold in said acidic solution to precipitate from said acidic solution wherein the molar ratio of said added sodium 2-mercaptopyridine-N-oxide to said gold is less than about 1.5:1.0 without any appreciable precipitation of said other metals; and
   (b) separating said precipitated gold from said acidic solution and said other metals.

7. The process of claim 6 wherein said molar ratio of said added sodium 2-mercaptopyridine-N-oxide to said gold is from about 0.5:1.0 to about 1.3:1.0.

8. The process of claim 7 wherein said separated precipitated gold is later recovered in its metallic form.

9. The process of claim 8 wherein said acidic solution is aqua regia.

10. The process of claim 7 wherein at least a major portion of said gold is precipitated from said acidic solution.

* * * * *